United States Patent

[11] 3,596,732

| [72] | Inventors | Emmett F. Glass<br>Akron;<br>Edmund O. Howell, New Holland; Bruce D. Schwalm, Leola, all of, Pa. |
|---|---|---|
| [21] | Appl. No. | 816,001 |
| [22] | Filed | Apr. 14, 1969 |
| [45] | Patented | Aug. 3, 1971 |
| [73] | Assignee | Sperry Rand Corporation<br>New Holland, Pa. |

[54] SPEED AND DIRECTION CONTROL MECHANISM FOR A TRACTOR HAVING TWO SEPARATELY DRIVEN FRONT WHEELS
12 Claims, 6 Drawing Figs.

| [52] | U.S. Cl. | 180/6.48, 74/531 |
|---|---|---|
| [51] | Int. Cl. | B62d 11/04 |
| [50] | Field of Search | 180/6.48, 6.5, 6.66, 77 H; 74/741, 741 XY, 531 |

[56] References Cited
UNITED STATES PATENTS

| 644,853 | 3/1900 | Fahl | 180/6.5 UX |
|---|---|---|---|
| 2,941,609 | 6/1960 | Bowers et al. | 180/6.48 |
| 3,190,385 | 6/1965 | Allport | 180/6.66 |
| 3,208,609 | 9/1965 | Davis | 180/6.48 |
| 3,431,993 | 3/1969 | Case | 180/6.48 |
| 3,180,305 | 4/1965 | Gower-Rempel | 180/6.48 |

FOREIGN PATENTS

| 1,322,845 | 2/1963 | France | 180/6.48 |
|---|---|---|---|

OTHER REFERENCES

German Printed Application 1,189,395, 3/1965, Richard, 180-77H, (3 sht.dwg.-6pp. spec.)

*Primary Examiner*—Benjamin Hersh
*Assistant Examiner*—John A. Pekar
*Attorneys*—Joseph A. Brown, John C. Thompson, James J. Kennedy and George C. Bower ABSTRACT: A tractor with two spaced front wheels and a trailing tail wheel has an operating lever controlling two sets of hydraulic pumps and motors independently driving a respective front wheel. The operating lever controls the pumps and motors through a linkage system by movement in a vertical longitudinal plane and the turning of the tractor by clockwise or counterclockwise rotation of the lever. Releasable friction means hold the lever in a given position in the longitudinal plane.

Patented Aug. 3, 1971

INVENTORS
EMMETT F. GLASS
EDMUND O. HOWELL
BRUCE D. SCHWALM

INVENTORS
EMMETT F. GLASS
EDMUND O. HOWELL
BRUCE D. SCHWALM

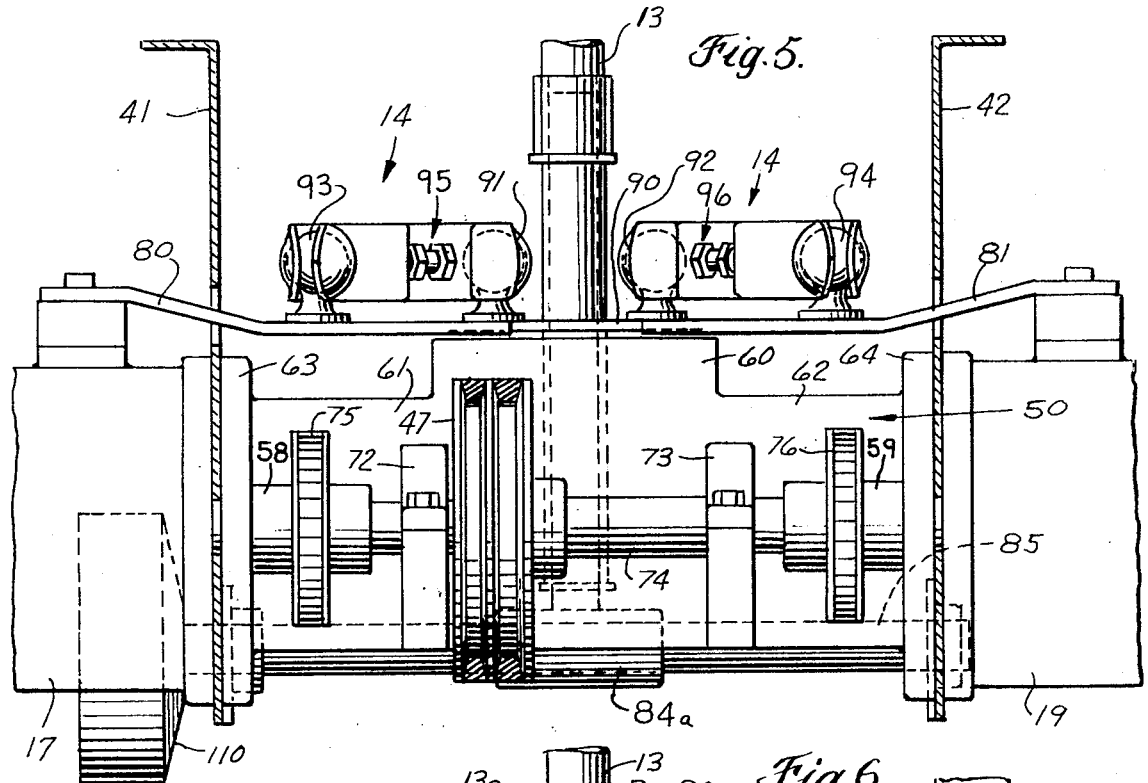
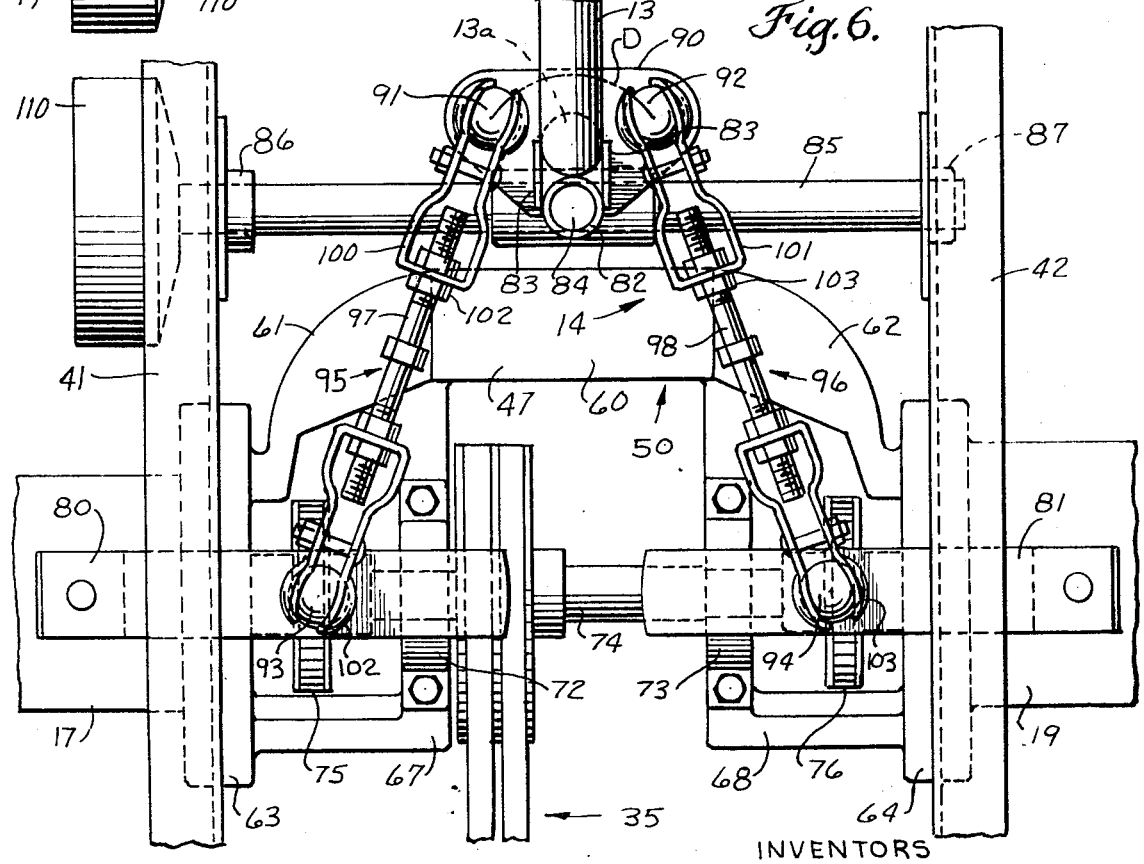
INVENTORS
EMMETT F. GLASS
EDMUND O. HOWELL
BRUCE D. SCHWALM

SPEED AND DIRECTION CONTROL MECHANISM FOR A TRACTOR HAVING TWO SEPARATELY DRIVEN FRONT WHEELS

BACKGROUND OF THE INVENTION

This invention relates to the means for operating two hydraulic transmissions separately connected to the two front wheels of a tractor and is directed particularly for controlling the speeds of the front wheels by the positioning of a single operating lever.

In the cutting of fields of grain, hay or similar crops the self-propelled windrower is driven across long stretches of fields and in cutting rows of crops the windrower must be held in line so that the header cuts across its entire length and does not leave any standing crops. At the end of each row the windrow must be capable of turning within a very small space to commence the return cut.

In previous self-propelled windrowers the front wheels of the tractors have been driven through planetary transmissions or belt transmissions which require two levers to operate the transmissions. Difference in wheel traction or hillside operation requires that the control levers be set at different angular positions to compensate for the difference between the wheels. Constant attention and separate operation of the two levers is required. This separate control by the tractor operator of each of the front tractor wheels is cumbersome and tiresome.

It is, therefore, desirable to provide a control and drive for the tractor wheels that has a single lever to control the forward and rearward speed and direction of both wheels and in cooperation with the single lever produce a differential in speed between the wheel for turning. It is also desirable to provide a control mechanism for separate driving of tractor wheels which will permit the turning and the maneuvering of an agricultural machine within a minimum of space and with ease of operation.

OBJECTS AND SUMMARY OF THE INVENTION

An object of this invention is to provide means for controlling the speed and direction of a tractor by a single-operating lever.

Another object of this invention is to provide a single lever control of the speed and direction of movement of the tractor by moving and holding the operating lever in a given plane.

Another object of this invention is to provide control means for two hydraulic transmissions separately driving the wheels of a tractor that has a single-operating lever controlling the transmissions and has means for holding the operating lever at a given speed.

Another object of this invention is to provide control means for two sets of hydraulic pumps and motors separately driving the wheels of a tractor that has a single-operating means controlling the forward and rearward speed and direction of the tractor that is movably retainable in a given position and includes means for producing a differential speed between the wheels for turning the tractor.

In summary this invention comprises the actuation of two sets of hydraulic pumps and motors separately driving the front wheels of a tractor by a single-operating lever connected to the separate pumps of the hydraulic transmission by a linkage mechanism which varies the speed and direction of the tractor by movement of the operating lever in a single plane and includes means for spinning or turning the tractor by rotating the operating lever and means for movably holding the single-operating lever in a given position.

Other and further objects and advantages of this invention will be apparent from the following specification and appended claims taken in connection with the drawings which illustrates a preferred embodiment of the invention.

BRIEF DESCRIPTION OF THE DRAWINGS

FIG. 5 is an enlarged sectional view of the control means taken along lines 5—5 of FIG. 3.

FIG. 6 is a top plan view of the control means of FIG. 5 taken in the direction of arrows 6—6.

DETAILED DESCRIPTION OF THE PREFERRED EMBODIMENT INTRODUCTION

Introduction

Figure 1:
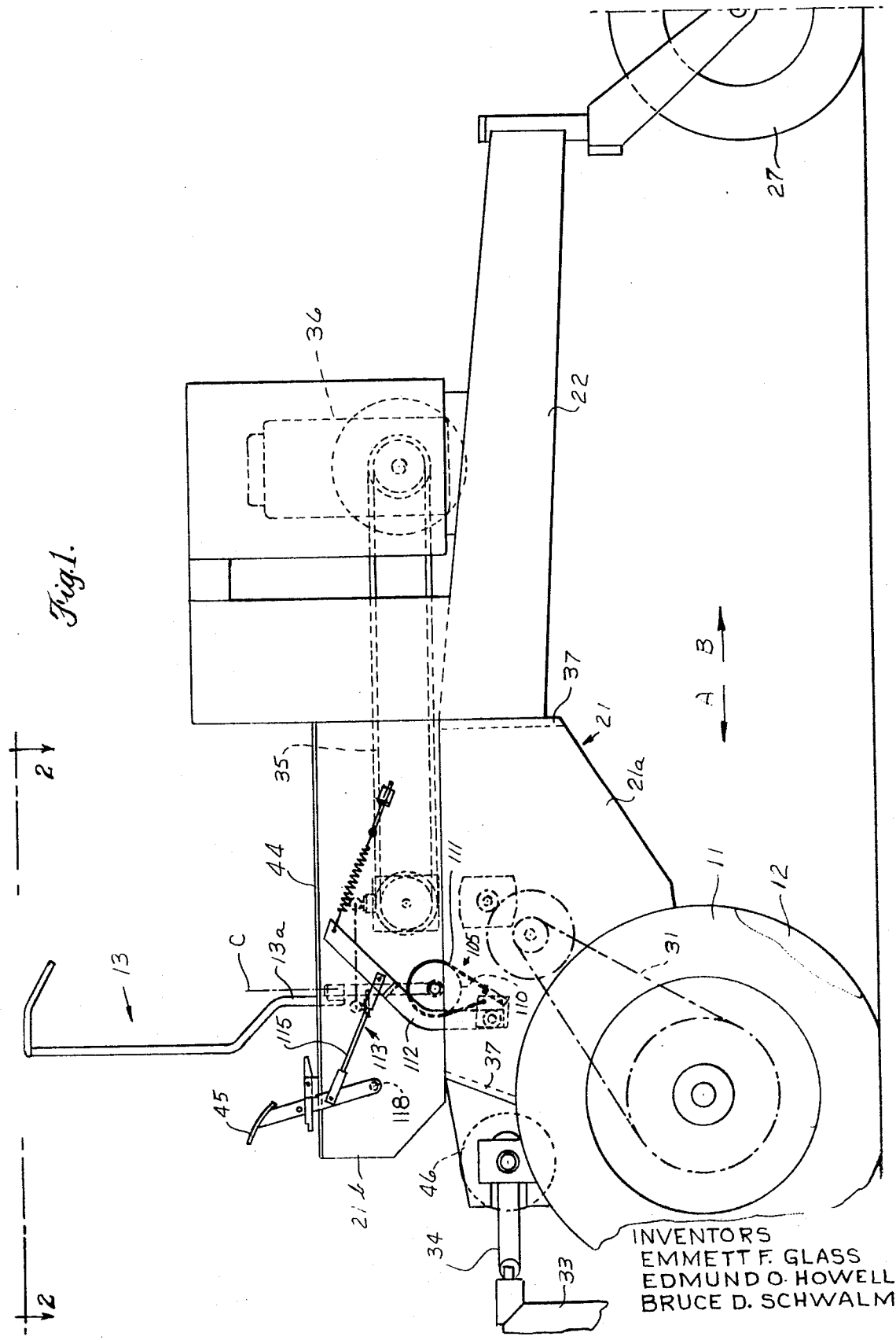
FIG. 1 is a side view of a tractor with separately driven front wheels.

The front wheels 11,12 of the tractor are independently driven in a forward direction A or a rearward direction B by the hydraulic transmissions 15,16. The tractor is turned either left or right by a speed differential between the wheels or by reversing one wheel in relation to the other. This operation is controlled by the backward or forward movement and by the clockwise or counterclockwise turning of the operating lever 13 through a linkage mechanism 14.

The tractor 10 has a main frame 21 and an engine-supporting frame 22 extending from the rear of the main frame. The front wheels 11,12 are attached to the casings of the main frame by wheel housing 25, 26 and support the main weight of the tractor and of the header 33 mounted on the front of the main frame by linkage mechanism (not shown). A tail wheel 27 is rotatably mounted at the apex of the engine-supporting frame 22 to carry the weight at the rear. The hydraulic transmissions drive the front wheels through chain drives 31,32 in the casings. A belt and pulley drive 35 connects the hydraulic transmissions to the engine 36. The header 33 is driven by a power takeoff 34 on the front of the main frame. The hydraulic transmissions comprise hydraulic pumps 17,19 and motors 18,20.

Frame Means

The main frame 21 comprises a low portion 21a and an upper portion 21b. The lower portion has transverse means 37 extending between the casings 23,24 for supporting the upper portion 21b. The upper portion 21b has four longitudinally extending frame members 40,41,42,43 mounted on the transverse means 37 of the lower portion. On top of the longitudinal frame members is the operator's deck 44 with the operator's lever 13 and brake peddle 45 extending therethrough.

The front wheels 11,12 carry the main portion of the weight of the tractor and of the header. The power takeoff 34 extends from a belt and pulley drive 46 at the front center of the lower portion 21b to the side of the header 33. As previously mentioned the engine-supporting portion 22 of the tractor is triangular in shape. The tailing wheel 27 is rotatably mounted at the rear apex of the engine-supporting portion. The engine 36 is intermediately mounted on the engine-supporting frame 22 and a casing 47 is mounted adjacent the main frame for housing a gasoline tank and other components of the tractor (not shown). The front guard rails, operator's seat, control pedestal, mounting steps and other elements have been omitted. The operator can stand or sit and move the operating lever 13 forwardly, rearwardly and turn it right or left for controlling the speed and direction of movement of the tractor. Between the two center longitudinally extending frame members 41,42 is a U-shaped casting 50 fastened to the frame members for forming a support for the pumps 17,19 of the universal hydraulic transmission means 15,16. The motors 18,20 are mounted on the casing 23,24.

Drive Means

As previously mentioned the front wheels 11, 12 are driven by the engine 36 mounted on the engine-supporting frame 22 through the belt and pulley drive 35, the hydraulic transmissions 15,16, the chain drives 31,32, connected to the front wheels 11,12 respectively. In the hydraulic transmissions the hydraulic pumps 17,19 are connected to the hydraulic motors 18,20 by the oil pressure pipes 51,52, respectively, for circulating oil driving the motors. The pipes 53 connecting the pumps and the pipes 54,55 connecting the motors and pumps provide for a circulation of the oil through an oil reservoir and filter (not shown). The hydraulic pump support 50 comprises a transversely extending main portion 60 with arms 61,62 extending from opposite ends and curving to the longitudinally extending flanges 63,64 which attach to the facing sides of the center frame members 41,42, respectively. The flanges 63,64 have openings for receiving the ends of the hydraulic pumps with the input shafts 58,59 extending coaxially towards one another. The pumps 17,19 are secured to the flanges 63,64, respectively. L-shaped members 67,68 extend from the base of the arms to the flanges and having means 72,73 for holding the bearings (not shown) supporting the shaft 74 on which the driven pulley of the engine belt and pulley drive 35 is mounted. The shaft 74 is coupled at the opposite ends to input shafts 58,59, respectively, of the pumps by flexible couplings 75,76. Thus the engine 36 drives the hydraulic pumps 17,19 of the hydraulic transmission. The hydraulic motors 18,20 are mounted on the inner sides of the casings 23,24, respectively, and are connected to the chain drives 31, 32. The output shafts 70,71 of the motors extend into the casings 23,24 and have spur gears 70a,71a mounted thereon meshing with the larger gears 72, 73 rotatably mounted in the casings 23, 24.

Actuating Mechanism

Figure 2:
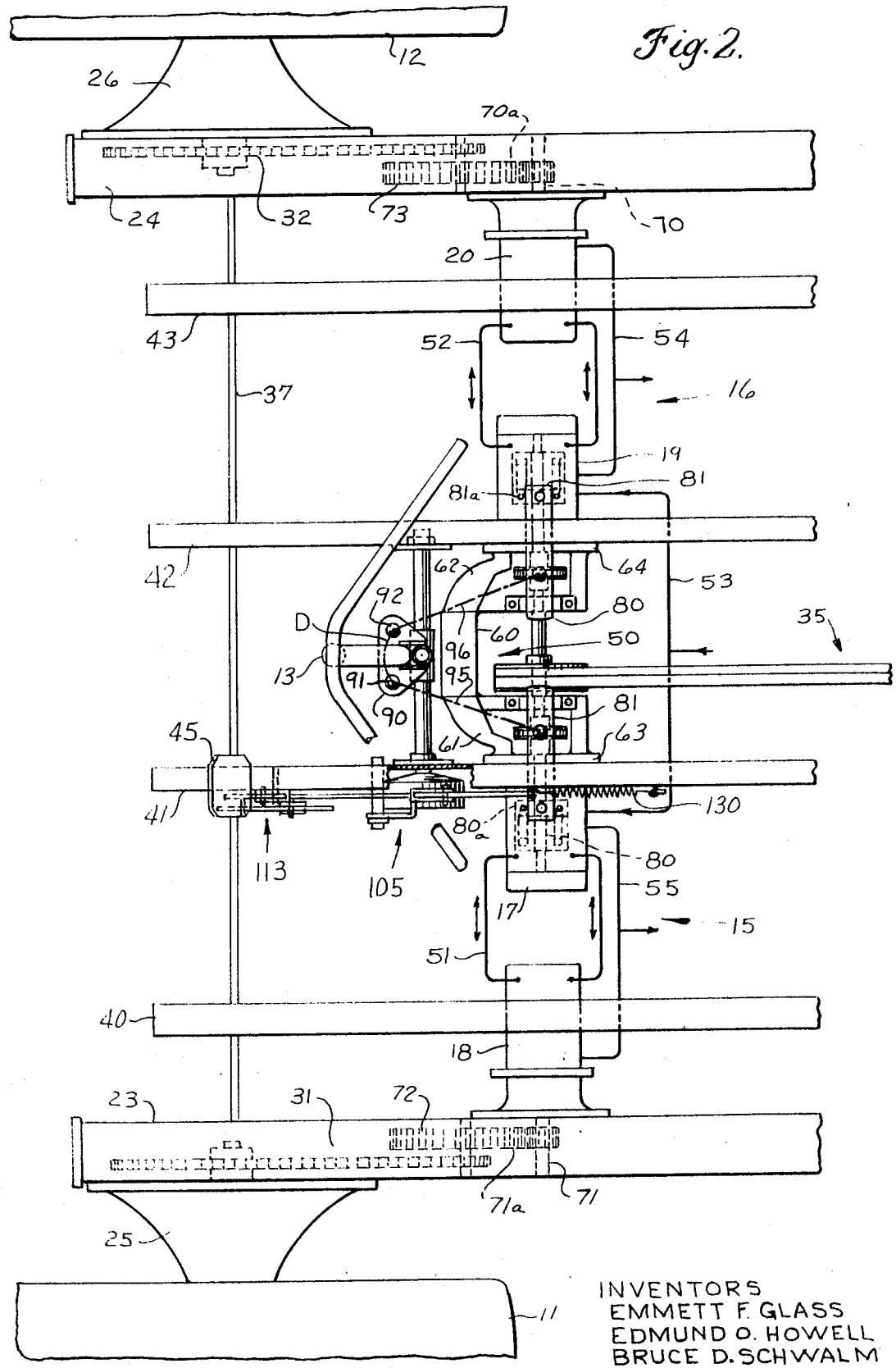
FIG. 2 is a fragmentary top view of the main frame with the operating deck omitted.
Figure 3:
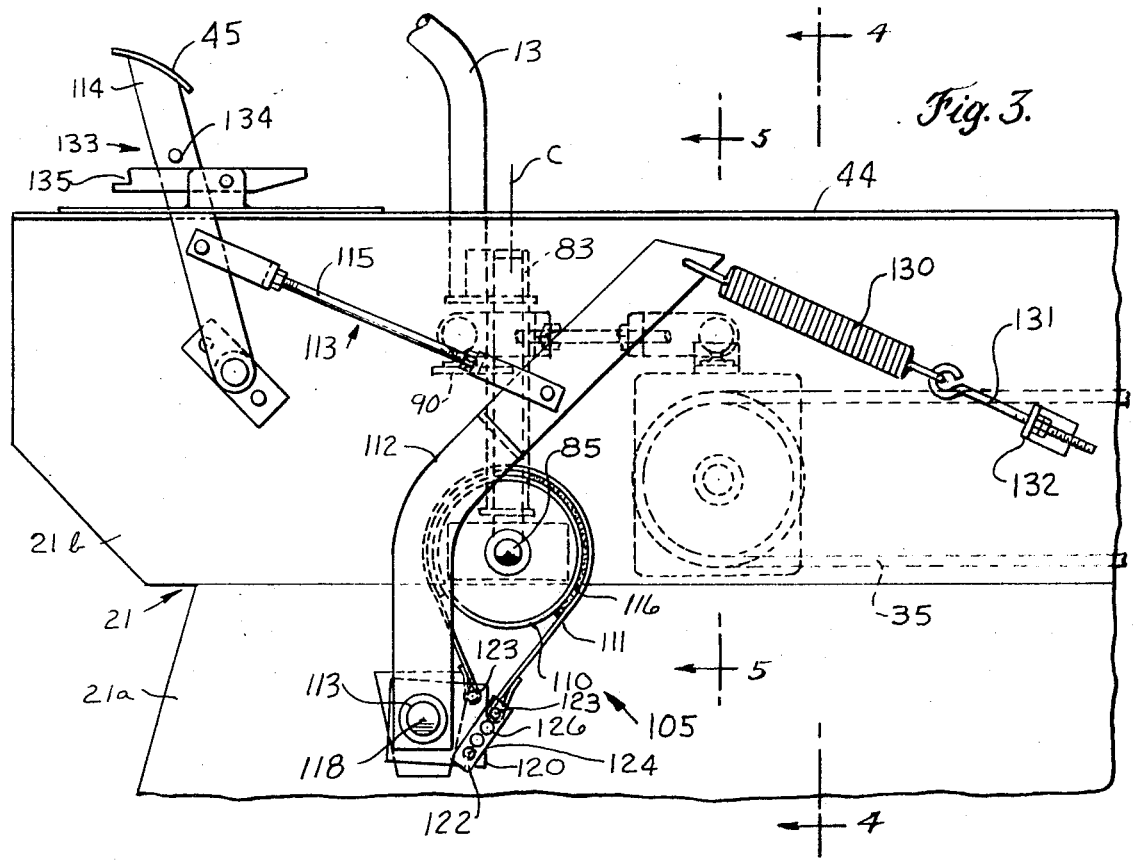
FIG. 3 is an enlarged fragmentary side view of the upper forward portion of the main frame and illustrates the holding means for retaining the operating lever at a given position.
Figure 4:
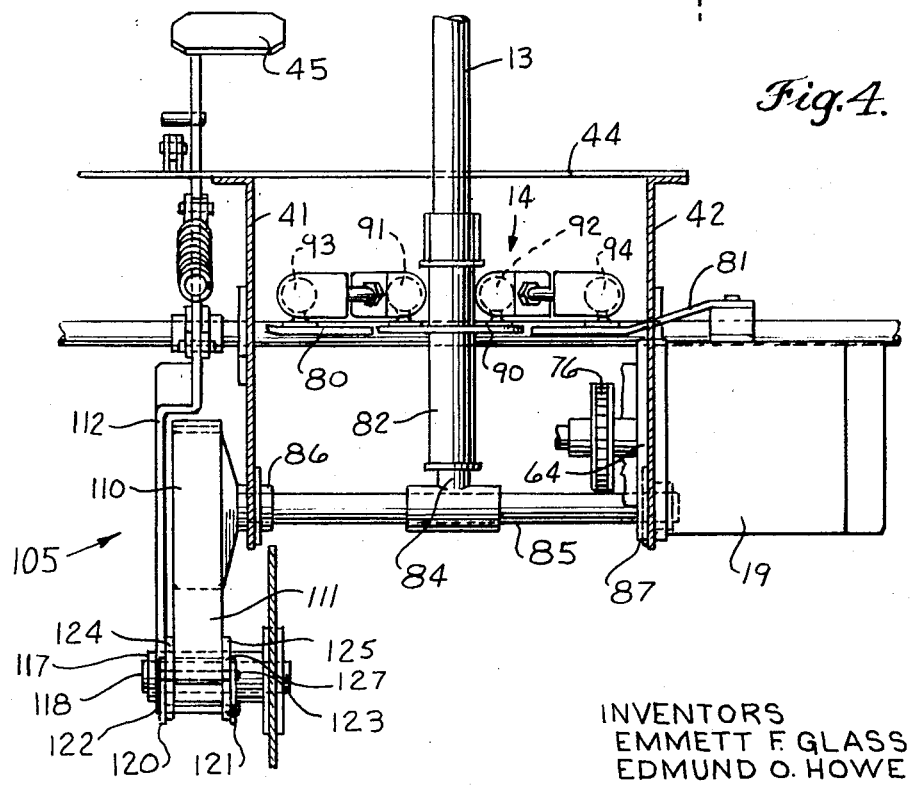
FIG. 4 is a sectional view illustrating the control means taken along lines 3—3 of FIG. 3.

The hydraulic pumps 17,19 have pintle arms 80,81 which are attached to the swashplates 80a,81a,of the pumps for shifting the angular position of the swashplates to vary the output of the pumps. The pintle arms 80,81 swing forward and backward about a neutral transverse position shown in FIG. 2. Forward movement of the pintle arms rotates the front wheels to drive the tractor in the forward direction A. The further the pintle arms are swung forward greater is the speed of rotation of the wheels. Movement of the pintle arms rearward drives the tractor in the reverse direction B and the further the pintle arms are moved to the rear the greater the rearward speed. A speed differential may be created by moving one pintle arm forward and the other rearward. This produces a turning action in the direction of the slower moving wheel. Thus the tractor may be turned to the left or right depending upon degree of differential of the pintle arms. The front wheels may be reversed and rotated in opposite directions by moving one pintle arm forward and the other one rearward from the neutral position. This will cause the tractor to spin.

The pintle arms 80,81 are actuated by a linkage mechanism 14. The linkage mechanism 14 comprises the drive and operating lever 13 having a vertically extending portion 13a with a sleeve 82 secured thereto by strips 83 on opposite sides of the shaft and sleeve. The sleeve 82 is slidably mounted on a post 84 to rotate about the longitudinal axis C of the post. The post 84 is fixedly attached to the pivot shaft 85 by the cylindrical portion 84a The shaft 85 is rotatably mounted in bearings 86,87 attached to the center frame members 41,42, respectively. Thus when the operating lever 13 is moved forward and backward the pivot shaft 85 is rotated in a vertical about the horizontal axis of the pivot shaft. With the sleeve 82 rotatably mounted on the post the operating lever may be moved in the clockwise or counterclockwise direction about the longitudinal axis C on the post which is moved in the vertical plane on the forward and rearward movement of the operating lever.

The sleeve 82 has a bracket 90 normal thereto with balls 91,92 fastened thereto on opposite sides of the vertical longitudinal plane in which the longitudinal axis C of the post rotates. These balls 91,92 are connected to corresponding balls 93,94 secured to the respective pintle arms 80,81 of the hydraulic pumps 17,19 by links 95,96. The links 95,96 comprise threaded shafts 97,98 resilient clamps 100,101,102,103 having ball sockets attached to balls 91, 92,93,94, respectively, and securely fastened thereto in rotatable relation by nuts 102,103. The links are on opposite sides of the vertical longitudinal plane containing the longitudinal axis C of the post. As the operating lever 13 is moved forward the links 95,96 rotate the pintle arms of the pumps 80,81 forwardly and when the operating lever is moved rearwardly the pintle arms, 80,81 are rotated to the rear. Thus the bracket 90 may be moved forwardly over a range of speeds or moved rearwardly over a range of speeds.

On rotation of the operating lever 13 one pintle arm angularly varies in relation to the other. The balls 91 and 92 move through the same arc D so that as one pintle arm is moved on rotation of the operating the other pintle arm moves in the opposite direction. If the operating lever 13 is rotated to the counterclockwise the right link 96 and pintle arm 81 are moved forwardly and the left link pintle arm 80 are moved rearwardly when the operating lever 13 is forward. The right wheel 12 will rotate at a greater speed than the left wheel 11 and the tractor will turn to the left, Correspondingly the tractor may be turned to the right by rotating the operating lever 13 clockwise.

In the case of reverse, if the operating lever is rotated counterclockwise when rearward, the left pintle arm 80 and link 95 would precede the right pintle arm 81 and link 96 and the left wheel would rotate at a greater speed than the right wheel so that the tractor would turn to the right in a rearward direction. Similarly by rotating the operating lever clockwise when rearward the tractor may be turned to the left.

Thus the tractor operator with a single control means may drive the tractor forwardly over a range of speeds or rearwardly over a range of speeds or turn the tractor to the left or right in a forward or rearward direction. Further if the tractor is standing still it may be spun by turning the operator's lever to the left or right.

Holding Means

The left center beam 41 and pivot shaft 85 has holding means 105 mounted thereon to retain the operating lever in any forward or rearward position set by the tractor operator. The holding means 105 may be released to permit the operating lever 13 to move freely. The holding means generally comprises a brake drum 110, band 111 and lever 112. The release means 113 comprises the peddle 45 and link 115 connected to the lever. The brake drum 110 is mounted on the end of the pivot shaft 85 projecting through the left center frame member 41. The brake band 111 with the brake shoe 116 extends around the periphery of the brakedrum 110 with the ends connected to the pivotally mounted lever 112. The lever 112 has a sleeve 117 rotatably mounted on the shaft 118 which is fixedly secured to the lower main frame 21. The sleeve 117 has two axially spaced brackets 120,121 fixedly attached thereto. The ends of the brake band 111 fit between the brackets and have pins 122,123 extending through the end for securing the brake band 111 to the lever 112. Adjustable links 124,125 with a plurality of holes 126,127 may be positioned between the lower end of the brackets and the brake band. On rotation of the lever in a rearward direction the brake band 111 is drawn in tight friction engagement with the brake drum 110. The lever 112 extends at an angle above the brakedrum and a helical spring 130 is connected between the upper end of the lever 112 and the upper frame 22 of the tractor by the bolt 131 and bracket 132. The lever 112 curves around the top of the tractor and is held in friction engagement with the drum by the helical spring 130. This frictional engagement is sufficient to hold the operating lever against usual forces but may be overcome by the operator without actuation of the release peddle.

The brake release means comprises the peddle 45 and link 115 with the brake lock 133 holding the lever 112 in a forward position to permit a free movement of the pivotal shaft 85. The brake is pivotally mounted on the inner center frame member 42 by means of brake shaft 118. The link 115 is connected to the lever 112 above the brakedrum 110 and to the brake peddle 45. The brake peddle is held by the brake lock 133 which includes a pin 134 fitting into the notch 135 on the brake lock 133 to hold the brake forward in the released condition.

Features of the Invention

It is thus seen from the foregoing description that control means with a single-operating lever movable in in a vertical longitudinal plane controls the speed and direction of the tractor. The control means is provided with a holding means to resist the movement of the operating lever and hold the operating lever in a given position for greater ease of operation. The drive to the wheels is through through two hydraulic transmissions. The hydraulic transmissions comprise separate pumps and motors with the motors mounted on a rigid supporting casting at the center of the main frame with the pintle arms of the motors extending towards each other and towards the center of the main frame for coupling with two links of the linkage mechanism. The links are connected to the operating lever on opposite sides of the vertical plane of movement of the lever to move the pintle arms forward and backward with the forward and backward movement of the operating lever. Thus the operating lever controls the speed as well as the forward and rearward movement of the tractor. This pivotal movement is obtained by mounting the operating lever on a horizontal transversely extending pivot shaft which has holding means at one end for resisting the movement of the operating lever and holding it at a given position. This retention may be overcome by the operator without the actuation of the release. The tractor operator may move the operating lever to a given tractor speed and release or casually hold the operating lever as the tractor moves across the field. The tractor may be readily turned or spun by rotating the operating shaft about its longitudinal axis. This produces a differential in the speed of the wheels by the angular position of the pintle arms being different or by moving one pintle arm forward and the other rearward.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

We claim:

1. A mechanism for controlling the outputs of two hydraulic pumps separately driving the front wheels of a tractor through two hydraulic motors respectively connected to said pumps comprising arms pivotally mounted on a respectively connected to said pumps comprising arms pivotally mounted on a respective pump to vary the outputs of said pumps, an operating lever, means pivotally mounting said lever to move forwardly and rearwardly in a vertical longitudinal plane and to rotate about a generally vertical axis in said longitudinal plane, means for mounting said pumps with said arms at substantially the same level and movable in the same direction on opposite sides of the longitudinal plane to similarly vary the outputs of said pumps, links pivotally connected to said respective arms and to said operating lever to rotate said arms as said operating lever is pivoted, means for holding said lever in any given position in the longitudinal plane while permitting overriding by a tractor operator, and release means connected to said holding means to disengage said holding means for free movement of said operating lever.

2. A mechanism for controlling the outputs of two hydraulic pumps separately driving through hydraulic motors the two front wheels of a tractor having a frame with two intermediate longitudinally extending frame members and comprising a mounting member between and secured to said frame members and having two outer first portions and two inner second portions spaced transversely from said outer portions, two hydraulic pumps mounted on said first outer respective portions of said mounting member and having drive shafts extending towards one another in axial alignment, means supported by said inner second respective portions of said mounting member and in axial alignment with and coupled to said shafts for driving said pumps, pintle arms on said hydraulic pumps for controlling the output thereof and pivotable in a horizontal plane, an operating lever, means for mounting said lever to pivot therewith in a vertical longitudinal plane, two links on opposite sides of the longitudinal plane pivotally connected to said operating lever and to respective pintle arms to vary the outputs of said hydraulic pumps by movement of said operating lever in the longitudinal plane.

3. A mechanism as set forth in claim 2 where said operating lever has means between said pivot means and said links to rotatably mount said lever on said pivot means about an axis in the longitudinal plane to create a differential between the outputs of said pumps by rotation of said lever about the lever axis.

4. A mechanism as set forth in claim 2 wherein friction means and release means are provided and said friction means mounted on said frame and connected to said means for pivotally mounting said lever to oppose longitudinal movement of said lever and holding said lever in a given position and said release means being mounted on said frame and connected to said friction means for permitting said lever to freely move through the range of forward and rearward positions.

5. A mechanism as set forth in claim 4 wherein said friction means comprises a brakedrum mounted on said pivot means, a brake band partially extending circumferentially around said drum and pivotally mounted lever means attached to said brake band to tighten said brake band in one position and release said brake band in the other position for free movement of said lever.

6. A mechanism as set forth in claim 5 wherein said brake band has ends and said lever means is pivotally mounted adjacent thereto and has means connecting said ends of said brake band to tighten said brake band on rotation of said lever in one direction and loosen said brake band on rotation in the opposite direction.

7. A mechanism as set forth in claim 6 wherein said lever means is spring loaded to hold said lever and brake band in the holding position.

8. A mechanism as set forth in claim 7 wherein release means are provided and connected to said lever to hold said lever and brake means in a disengaged condition.

9. A mechanism as set forth in claim 8 wherein said release means includes a brake lever pivotally mounted at one end, a link connected to said lever means and said brake lever to loosen said friction means on rotation of said brake lever and releasable lock means engaging said brake lever to hold said brake lever and said friction means in a disengaged condition.

10. A speed and direction control mechanism for a tractor having two separately driven front wheels comprising two sets of hydraulic pumps and motors with said motors driving respective wheels and said pumps connected to respective motors for controlling the output of the respective motors, said pumps having pintle arms, movable in the same direction on opposite sides of a longitudinal plane and aligned at substantially the same level and rotatably mounted on said tractor, a rotatably mounted pivot shaft extending transversely, an operating lever mounted on said pivot shaft for pivoting with said shaft in the longitudinal plane and rotating about an axis in the longitudinal plane, a bracket mounted on said lever to pivot and rotate with said lever, two ball pivots on said bracket on opposite sides of the longitudinal plane, ball pivots on said respective pintle arms, two links on opposite sides of the longitudinal plane and pivotally connected to respective bracket ball of pivots and a respective pintle arm ball pivot to move a respective pintle arm on pivoting and rotating said lever to vary the outputs of said pumps, a brake drum coupled to said pivot shaft, a brake band mounted on said drum, lever means pivotally mounted on said tractor and having attaching means connected to said ends of said brake band for tightening and loosening said brake band on said drum, a spring connected to said lever means to grip said brake band on said drum to retain said lever in any pivoted position and release means connected to said lever means to move said lever means to relieve said brake band from a gripping relation to permit free pivoting of said operating lever.

11. A speed and direction control mechanism as set forth in claim 10 wherein said release means comprises a foot pedal and a link connected between said foot pedal and said lever means.

12. A speed and direction control mechanism as set forth in claim 10 wherein said ball pivots on said bracket rotate in the same arc around the lever axis.